(12) United States Patent
Pugh et al.

(10) Patent No.: US 6,834,291 B1
(45) Date of Patent: Dec. 21, 2004

(54) GOLD CODE GENERATOR DESIGN

(75) Inventors: Daniel J. Pugh, San Jose, CA (US); Mark Rollins, Stittsville (CA)

(73) Assignee: Intel Corporation, Santa Clara, CA (US)

( * ) Notice: Subject to any disclaimer, the term of this patent is extended or adjusted under 35 U.S.C. 154(b) by 508 days.

(21) Appl. No.: 09/698,694

(22) Filed: Oct. 27, 2000

(51) Int. Cl.[7] .............................................. G06F 7/58
(52) U.S. Cl. ........................ 708/252; 708/253; 708/254
(58) Field of Search ................................ 708/252, 253, 708/254

(56) References Cited

U.S. PATENT DOCUMENTS

| | | | | |
|---|---|---|---|---|
| 5,111,416 A | * | 5/1992 | Harada | ........................ 708/250 |
| 5,566,099 A | * | 10/1996 | Shimada | ...................... 708/250 |
| 5,966,534 A | | 10/1999 | Cooke et al. | |
| 5,970,254 A | | 10/1999 | Cooke et al. | |
| 6,192,385 B1 | * | 2/2001 | Shimada | ...................... 708/250 |
| 2001/0033663 A1 | * | 10/2001 | Ishimoto et al. | ............. 380/265 |

OTHER PUBLICATIONS

*Theory and Application of Pseudonoise Sequences*, CDMA Systems Engineering Handbook, Jhong Sam Lee and Leonard E. Miller (1998), pp. 543–675.

* cited by examiner

*Primary Examiner*—Tan V. Mai
(74) *Attorney, Agent, or Firm*—Blakely, Sokoloff, Taylor & Zafman LLP

(57) ABSTRACT

Embodiments for a gold code generator are generally described herein.

26 Claims, 9 Drawing Sheets $C_{long1,n}$ = LFSRA[7:0] XOR LFSRB[7:0]

Let us define LFSRC'[i] = LFSRC[2[i/2]]

$C_{long,n}(i) = C_{long,n}(i)(1+j(-1)^i(c_{long2,n}(2[i/2]))$ (From 3G TS25.213)

Multiplying bits by +1/-1 is the same as XOR for 0s and 1s.

XORing by 0xAA can be used in place of the $(-1)^i$ term.

In binary representation, the Scrambling code $C_{long,n}$ becomes:

$C_{long,n}$[7:0] = $C_{long1,n}$[7:0](1+j(0xAA) XOR $C'_{long2,n}$[7:0])

$C_{long,n}$[7:0] = LSFRA[7:0] XOR LFSRB[7:0]

+J(LFSRA[7:0] XOR LFSRB[7:0] XOR 0xAA XOR LFSRC'[7:0] XOR LFSRD'[7:0])

$C_{long,n}$[7:0] = SCI[7:0] = Jscq[7:0]

Let us define LFSRD"[7:0] = 0xAA XOR LFSRD'[7:0], then:

$C_{long,n}$[7:0] = (LFSRA[7:0] XOR LFSRB[7:0])

+ j(LFSRA[7:0] XOR LFSRB[7:0] XOR LFSRC'[7:0] XOR LFSRD"[7:0])

We use a lookup table to compute LFSRC'[7:0] and LFSRD"[7:0])

Fig. 7

Gold code generator lookup[6:0] definitions

| At address 4n+0: OUT[7:0] = Next StateA[3:0]:PASSA[3:0] | At address 4n+2: OUT[7:0] = Next StateC[3:0]:LFSRC'[3:0] |
|---|---|
| OUT[7] = IN[6] XOR IN[3]<br>OUT[6] = IN[5] XOR IN[2]<br>OUT[5] = IN[4] XOR IN[1]<br>OUT[4] = IN[3] XOR IN[0]<br>OUT[3] = IN[3]<br>OUT[2] = IN[2]<br>OUT[1] = IN[1]<br>OUT[0] = IN[0] | OUT[7] = IN[6] XOR IN[3]<br>OUT[6] = IN[5] XOR IN[2]<br>OUT[5] = IN[4] XOR IN[1]<br>OUT[4] = IN[3] XOR IN[0]<br>OUT[3] = IN[3]<br>OUT[2] = IN[2]<br>OUT[1] = IN[1]<br>OUT[0] = IN[0] |
| At address 4n+1: OUT[7:0] = Next StateB[3:0]:PASSA[3:0] | At address 4n+3: OUT[7:0] = Next StateD[3:0]:LFSRD''[3:0] |
| OUT[7] = IN[6] XOR IN[5] XOR IN[4] XOR IN[3]<br>OUT[6] = IN[5] XOR IN[4] XOR IN[3] XOR IN[2]<br>OUT[5] = IN[4] XOR IN[3] XOR IN[2] XOR IN[1]<br>OUT[4] = IN[3] XOR IN[2] XOR IN[1] XOR IN[0]<br>OUT[3] = IN[3]<br>OUT[2] = IN[2]<br>OUT[1] = IN[1]<br>OUT[0] = IN[0] | OUT[7] = IN[6] XOR IN[5] XOR IN[4] XOR IN[3]<br>OUT[6] = IN[5] XOR IN[4] XOR IN[3] XOR IN[2]<br>OUT[5] = IN[4] XOR IN[3] XOR IN[2] XOR IN[1]<br>OUT[4] = IN[3] XOR IN[2] XOR IN[1] XOR IN[0]<br>OUT[3] = /IN[2]<br>OUT[2] = IN[2]<br>OUT[1] = /IN[0]<br>OUT[0] = IN[0] |

Fig. 8A

Gold code generator lookup[10:4] definitions

| At address 4n+0: OUT[7:0] = IN[7:4] Next StateA[7:4] | At address 4n+0: OUT[7:0] = IN[7:4] Next StateA[7:4] |
|---|---|
| OUT[7] = IN[3]<br>OUT[6] = IN[2]<br>OUT[5] = IN[1]<br>OUT[4] = IN[0]<br>OUT[3] = IN[6] XOR IN[3]<br>OUT[2] = IN[5] XOR IN[2]<br>OUT[1] = IN[4] XOR IN[1]<br>OUT[0] = IN[3] XOR IN[0] | OUT[3] = IN[2]<br>OUT[2] = IN[2]<br>OUT[1] = IN[0]<br>OUT[0] = IN[0]<br>OUT[7] = IN[6] XOR IN[3]<br>OUT[6] = IN[5] XOR IN[2]<br>OUT[5] = IN[4] XOR IN[1]<br>OUT[4] = IN[3] XOR IN[0] |
| At address 4n+1: OUT[7:0] = IN[7:4] Next StateB[7:4] | At address 4n+1: OUT[7:0] = IN"[7:4]Next StateB[7:4] |
| OUT[7] = IN[6]<br>OUT[6] = IN[5]<br>OUT[5] = IN[4]<br>OUT[4] = IN[3]<br>OUT[3] = IN[3] XOR IN[5] XOR IN[4] XOR IN[3]<br>OUT[2] = IN[2] XOR IN[4] XOR IN[3] XOR IN[2]<br>OUT[1] = IN[1] XOR IN[3] XOR IN[2] XOR IN[1]<br>OUT[0] = IN[0] XOR IN[2] XOR IN[1] XOR IN[0] | OUT[3] = /IN[2]<br>OUT[2] = IN[2]<br>OUT[1] = /IN[0]<br>OUT[0] = IN[0]<br>OUT[7] = IN[6] XOR IN[5] XOR IN[4] XOR IN[3]<br>OUT[6] = IN[5] XOR IN[4] XOR IN[3] XOR IN[2]<br>OUT[5] = IN[4] XOR IN[3] XOR IN[2] XOR IN[1]<br>OUT[4] = IN[] XOR IN[2] XOR IN[1] XOR IN[0] |

Fig. 8B

GOLD CODE GENERATOR DESIGN

BACKGROUND OF THE PRESENT INVENTION

The present application concerns pseudo-random generators, in particular gold code generators.

Pseudo-random generators have applicability for a number of communication systems, in particular, for spread spectrum wireless communications. In spread spectrum transmissions, the circuit artificially spreads the transmitted signals bandwidth by modulating an information signal, either in phase or frequency, with a pseudo-random sequence that occurs at a greater rate than that required for the data alone. During signal reception, the receiver synchronizes an internal pseudo-random generator to the pseudo-random sequence of the transmitted signal to fully recover the available power and decode the message. Most direct sequence spread spectrum systems pseudo-randomly modulate the phase of the RF carrier signal 10 times or greater than the rate required for the data transmission. This results in a signal spectrum which is much broader than would be occupied if the RF carrier signal were modulated by only the data stream. Frequency hopping systems use the pseudo-random generator to implement frequency hops within the spread spectrum range.

Matching pseudo-random generators at the transmitter and receiver allow the correlation and recovery of the information signal. Other transmitted signals with different pseudo-random codes can be transmitted in the same bandwidth since the correlation between the different pseudo-random codes is quite low. The transmissions using the different pseudo-random codes will tend not to significantly interfere with one another.

One way of implementing a pseudo-random generator is with a linear feedback shift register (LFSR). Taps from the linear feedback register are sent to a logic circuit to create a new input (feedback) bit. The linear shift register runs through a large number of different codes before repeating. The linear feedback shift register is preferably selected with a feedback path producing the maximum code length. Also beneficial for the linear shift register is low auto-correlation with shifts in the pseudo-random sequence and low cross-correlation with other sequences.

One preferred way of implementing a pseudorandom sequence is to combine the outputs of two linear feedback shift registers. Such a pseudo-random generator is called a gold code generator.

FIG. 1 illustrates a gold code generator used with the UMTS European wireless standard. The gold code generator is constructed of two linear feedback shift registers. The first linear feedback shift register has feedback taps from registors 0 and 3. The second linear feedback shift register has feedback taps at registors 0, 1, 2, and 3. The first serial linear feedback shift register's output is combined with the output of the second linear feedback shift register in the EXCLUSIVE-OR 40. The first linear feedback shift register 42 has taps at registers 4, 7 and 18 that go to a EXCLUSIVE-OR (mask) 44. The second linear feedback shift register 46 has taps at registers 4, 6, and 17 fed to the EXCLUSIVE-OR 48. The output to the EXCLUSIVE-ORs 44 and 48 are sent to a second output EXCLUSIVE-OR 52.

It is desired to have an improved implementation of a gold code generator.

SUMMARY OF THE PRESENT INVENTION

The inventors have noticed that the range of taps used to implement the second output of the UMTS gold code generator standard is quite broad: In the first linear shift register between taps 4 and 18 and in the second linear shift register between taps 4 and 17. This broad range of taps makes it difficult to implement a parallel implementation of the gold code generator in arithmetic logic units or other computational units that operate on parallel data.

Since the second output is in fact a delayed version of the first output, the gold code generator can be implemented by forming two pairs of linear feedback shift registers and using different seeds for the second pair of linear feedback shift registers. This significantly reduces the range of the output taps in any of the linear feedback shift registers, and makes it easier to implement a parallel implementation of the gold code generator to produce multiple output bits.

One embodiment of the present invention comprises a gold code generator comprising two pairs of linear feedback shift registers wherein the second seed values for the second pair of linear feedback shift registers are different from the first seed values for the first pair of linear feed back state machines. The second seed values are calculated from the first seed values, wherein the first and second pair of linear feedback shift registers are implemented to produce more than one input bit and more than one output bit for each linear feedback shift registers at the same time.

Another embodiment of the present invention comprises at least one reconfigurable chip implementing a gold code generator, the at least one reconfigurable chip including background and foreground configuration memories. The background configuration memory is adapted such that it can be loaded with a gold code generator configuration while the at least one reconfigurable chip configured with the foreground configuration operates. After the background configuration is loaded with the gold code generator configuration, the background plane is activated to reconfigure the at least one reconfigurable chip.

Another embodiment of the present invention comprises a method of implementing a pseudo-random code generator comprising the steps of converting a pseudo-random code generator specification into an equivalent representation. The pseudo-random code generator specification being such that taps used to calculate an output include at least one tap within n spaces of the input. Equivalent representation is such that no taps are within n spaces from the input. The method includes implementing the equivalent representation such that n new state bits are calculated at the same time.

Another embodiment of the present invention is a method of implementing a pseudo-random code generator, the method comprising converting a pseudo-random code generation specification into an equivalent of representation. The pseudo-random code generator specification being such that taps used to calculate an output bit are defined within a first shift register span, the equivalent representation is such that taps used to calculate an output bit within a smaller shift register span. The method includes implementing the equivalent representation such that multiple new bit states are calculated at the same time.

BRIEF DESCRIPTION OF THE DRAWINGS

FIG. 7 is a diagram illustrating the Galois field calculations for the seed values.

FIG. 8A and FIG. 8B are tables illustrating the values of the lookup tables of FIG. 3.

DETAILED DESCRIPTION OF THE PREFERRED EMBODIMENT

Figure 1:
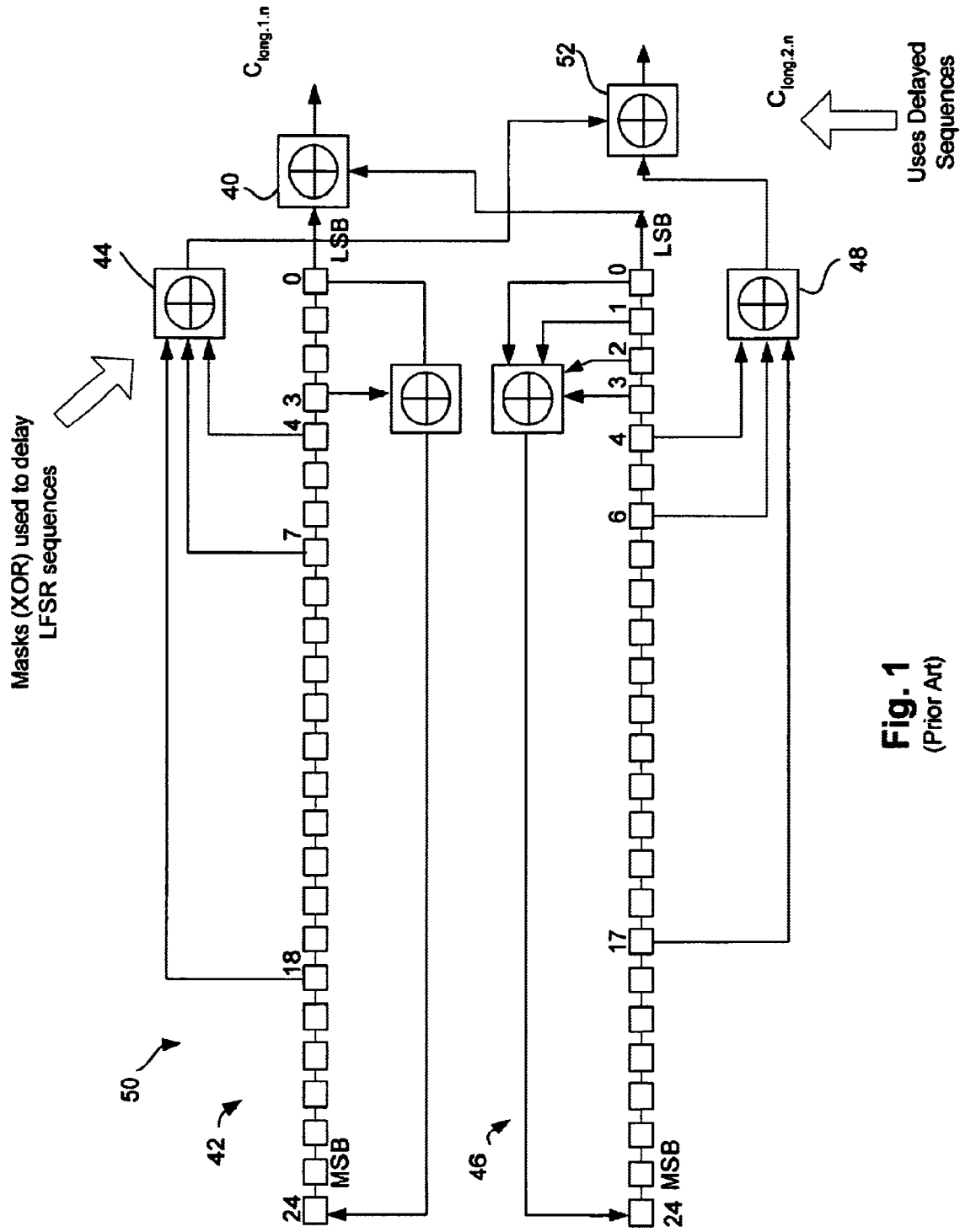
FIG. 1 illustrates a diagram of a prior art gold code generator.
Figure 2:
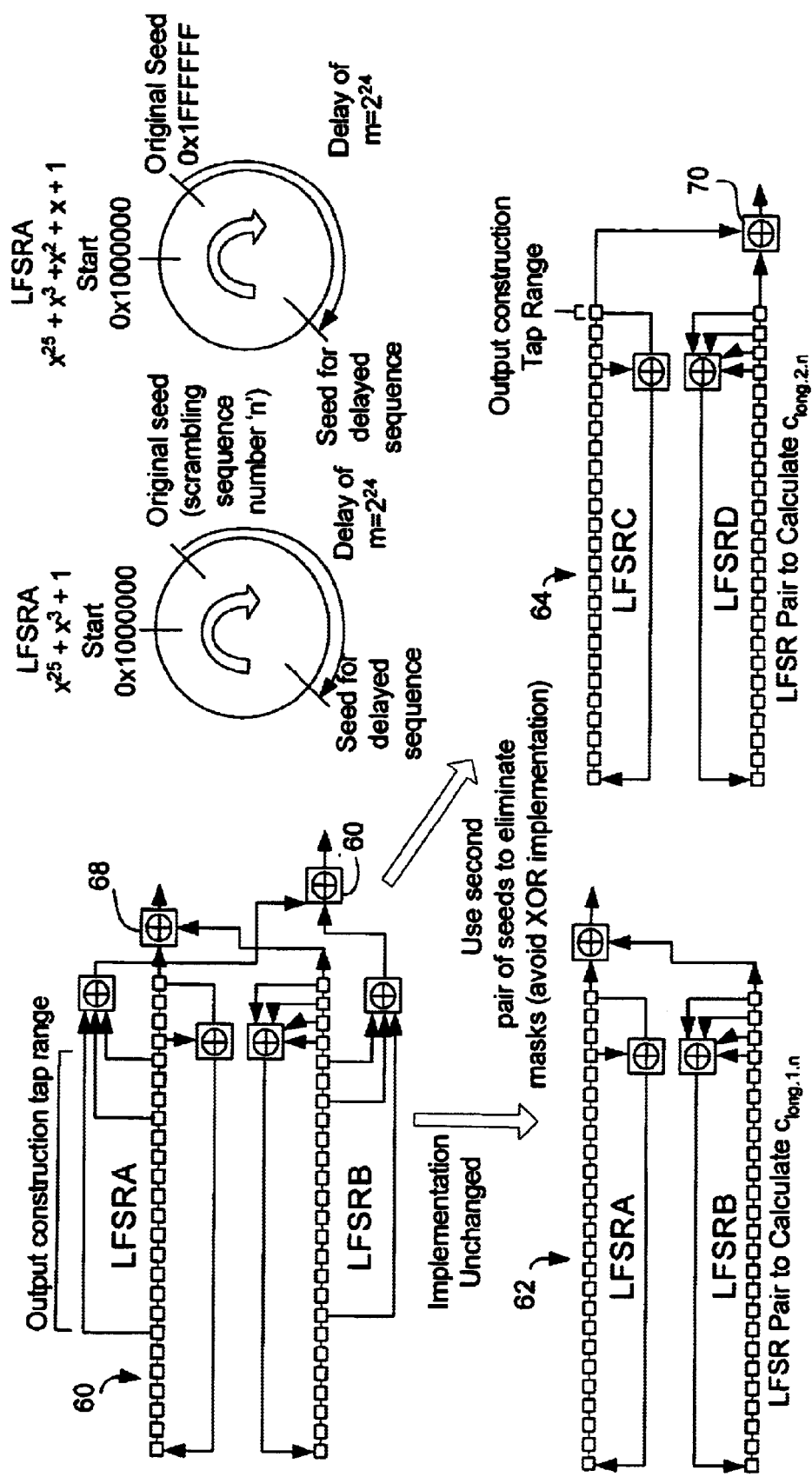
FIG. 2 shows the diagram illustrating the implementation of the gold code generator of FIG. 1 into an equivalent representation.

FIG. 2 illustrates the conversion of the gold code generator 60 as defined in the UMTS specification into an equivalent representation using two pairs of linear feedback shift registers, pairs 62 and 64. The output from unit 66 of the gold code generator 60 is equivalent to a delayed sequence of the output unit 68. In the present invention, multiple pairs of the linear feedback shift register are used, the second pair of linear feedback shift registers uses a second pair of seed values such that output of the second pair of linear feedback shift registers 64 is a delayed sequence of the sequence produced by the output 66 of the gold code generator 60.

Although the equivalent representation uses more resources, this equivalent representation can be implemented in a parallel implementation that produces multiple output bits. Such a representation is especially useful when implemented with a reconfigurable chip in which reconfigurable elements are configured by configuration bits. One reason why it is easier to do a parallel implementation of the equivalent representation is that a narrow range of output taps is used with the equivalent representation. The output 66 of the gold code generator 60 is quite broad. This makes it difficult to calculate multiple output bits with the standard gold code representation. In the equivalent representation, the linear feedback shift register pair 64 has only two output bits going to the EXCLUSIVE-OR 70. Additionally, the taps used to produce the feedback states remain relatively close together for both of the pairs of the linear feedback shift registers.

The second shift register 64 is seeded with a new initial seed. This new initial seed value can be calculated before operation of the gold code generator. This calculation is a Galois field calculation which can be done as shown in FIG. 7. Additional discussion of the Galois field calculation is given in Chapter 6 entitled "Theory and application of pseudo-random sequences" in the reference "CDMA Systems Engineering Handbook" by Lee and Miller, which is incorporated herein by reference.

Additionally, a copy of the C code to calculate the seed values including some corrections to the math of the Lee and Miller book are enclosed as Appendix II to this application.

In a preferred embodiment, each of the linear feedback shift registers is reset to an initial value at the beginning of each frame. The seed for the linear feedback shift register LFSRA is assigned by the network controller for each user. The seed for the linear feedback shift register LFSRB is 0x1FFFFF for all users. The seed for the linear feedback shift register LFSRC is the contents of the linear feedback shift register LFSRA seed shifted by 16,777,232,000 cycles, and can be computed by a processor at the beginning of each call. The seed for linear feedback shift register LFSRD is 0x1FFFFF shifted by 16,777,232,000 cycles for each user and thus is a static constant value which can be precalculated and stored. The seed for all of the linear feedback shift registers can be stored in memory elements in a reconfigurable fabric.

Figure 3:
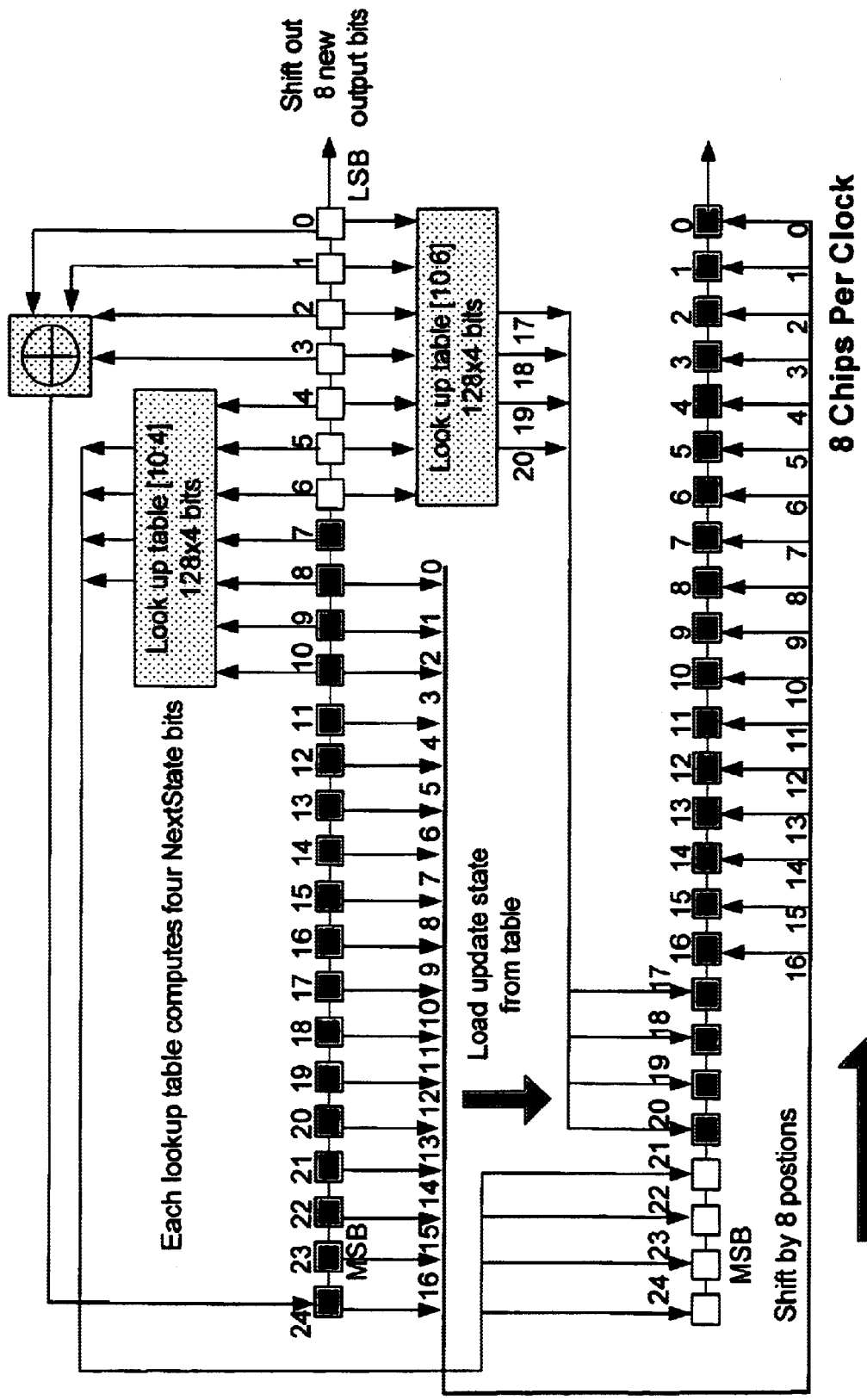
FIG. 3 is a diagram of that illustrates a parallel implementation of the gold code generator.

FIG. 3 shows a parallel implementation of one of the linear feedback shift registers of the equivalent representation. The span of taps to produce an output bit is quite small so no complicated logic is required to calculate an output. The input bits are also calculated in parallel using lookup tables. Note how a parallel implementation spreads the number of taps needed for the feedback or output calculations. There is no requirement for a really wide span lookup table for the output bits since the equivalent representation is used.

FIGS. 8A and 8B show the table lookup values of one embodiment of the lookup tables of FIG. 3.

Figure 4:
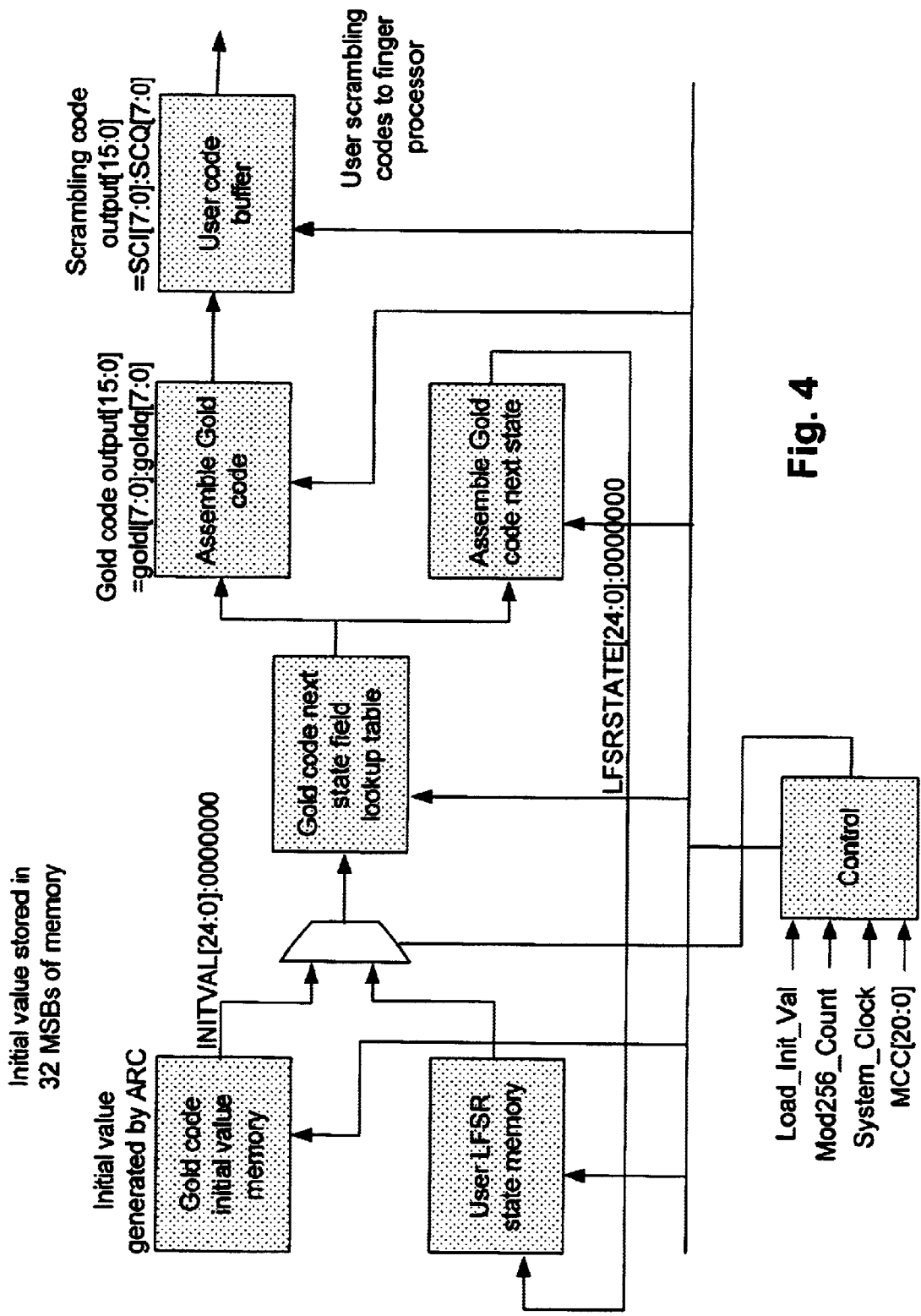
FIG. 4 is a diagram of a functional block diagram of a gold code generator.

FIG. 4 illustrates a functional block diagram of a gold code generator in one embodiment. The gold code generator of one embodiment deals with multiple users, each user having a different input seed thus producing different sequence of the gold code generator, each of the different sequences having a relatively low cross-correlation. In this embodiment, for each seed the delayed version for the second pair of shift registers must be calculated using the Galois field calculation described above.

Figure 5:
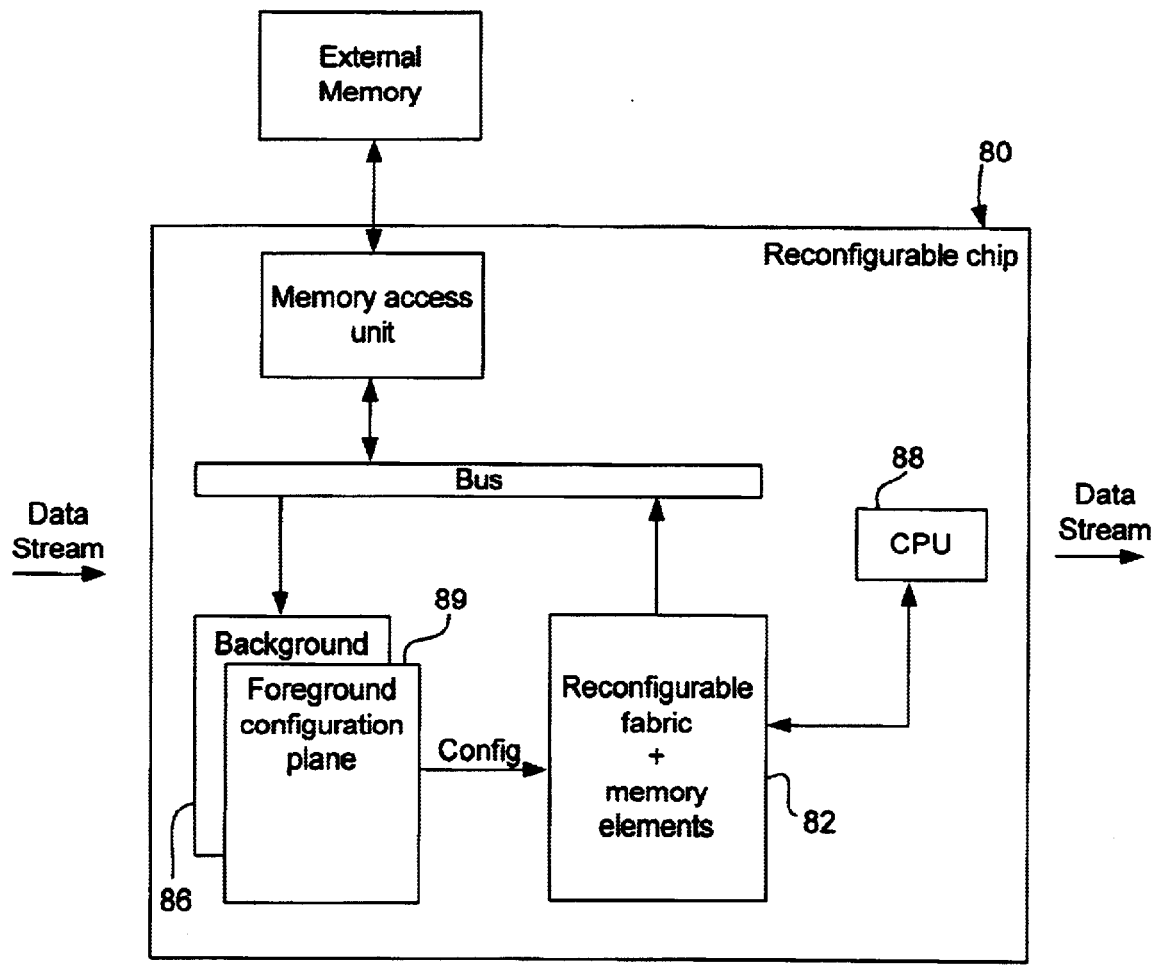
FIG. 5 is a diagram of a reconfigurable chip which can be used for implementing the gold code generator of the present invention.

FIG. 5 illustrates a reconfigurable chip 80. The reconfigurable chip 80 implements the gold code generator in one embodiment. The reconfigurable chip 80 includes a reconfigurable fabric 82 which can be configured into a variety of configurations. The CPU 88 can be used for the LFSRC seed calculations that are difficult to do in the reconfigurable fabric.

In a preferred embodiment, the reconfigurable chip 80 includes the processor 88 such as a reduced instructions set computing (RISC) central processing unit (CPU). In one embodiment the CPU 88 runs portions of the algorithms which are difficult to implement in the reconfigurable fabric.

In one embodiment, the reconfigurable fabric is configured by a foreground configuration plane 84. While the foreground configuration plane 84 is operating, the background configuration can be loaded from the background plane 86. The reconfigurable fabric 82 in a preferred embodiment includes a number of configurable data path units, memory elements, and interconnect elements.

In one embodiment, the data path units include comparators, an arithmatic unit (ALU), and registers which are configurable to implement operations of the algorithm. In one embodiment the reconfigurable fabric 82 also includes dedicated elements such as multiple elements and memory elements. The memory elements can be used for storing algorithm data.

Figure 6A:
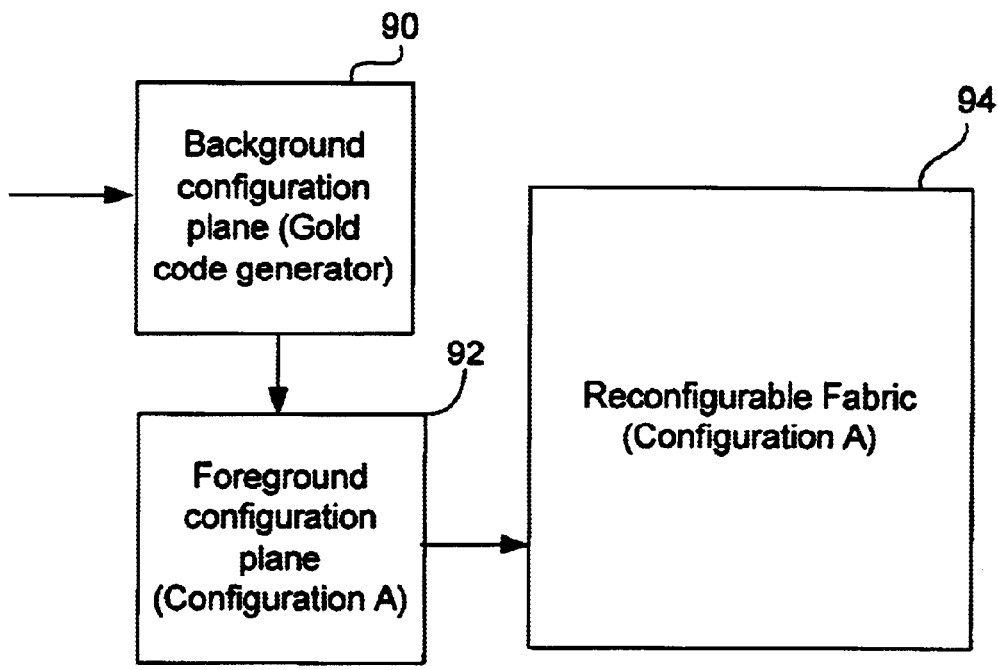
FIG. 6A and FIG. 6B show a method of switching in the gold code configuration used with one embodiment of the present invention into a reconfigurable fabric of a reconfigurable chip.
Figure 6B:
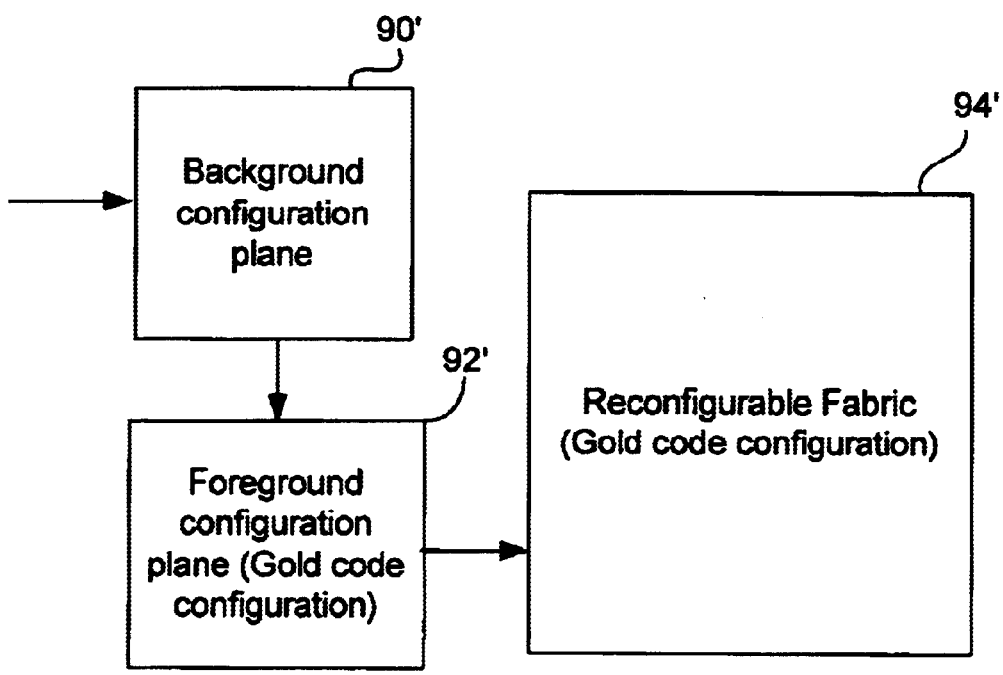

FIGS. 6A and 6B illustrate the operation of the reconfigurable fabric to the system of the present invention. In FIG. 6A, the gold code generator configuration is loaded into the background configuration plane 90. The foreground configuration plane 92 is configured with another configuration so as to configure the reconfigurable fabric with that configuration. In FIG. 6B the configuration plane in background plane is loaded into the foreground plane. This almost instantaneously configures the reconfigurable fabric 92' into the gold code generator configuration.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A gold code generator comprising:

two pairs of linear feedback shift registers, wherein second seed values for the second pair of linear feedback shift registers are different from first seed values for the first pair of linear feedback shift registers, the second seed values being calculated from the first seed values, wherein the first and second pair of linear feedback shift registers are implemented to produce more than one new state bit and more than one output bit for each linear feedback shift registers at the same time.

2. The gold code generator of claim 1 wherein the seed values for the second pair of linear feedback shift registers are delayed values of the first seed values.

3. The gold code generator of claim 1 wherein the gold code generator is implemented on a reconfigurable chip.

4. The gold code generator of claim 3 wherein the calculation of some of the second seed values is done using a dedicated processor on the reconfigurable chip.

5. The gold code generator of claim 3 wherein the gold code generator configuration is loaded into a background plane of the reconfigurable chip, while the reconfigurable chip is operating on another configuration in the foreground.

6. The gold code generator of claim 3 wherein the feedback is implemented using lookup tables.

7. A method of implementing a psuedo-random code generator:

converting a psuedo-random code generator specification into an equivalent representation, the psuedo-random code generator specification being such that taps used to calculate an output include at least one tap within n spaces from the input, the equivalent representation is such that no such taps are within n spaces from the input; and implementing the equivalent representation such that multiple new state bits are calculated at the same time.

8. The method of claim 7 wherein the pseudo-random code generator specification being such that taps to calculate an output is defined within a first shift register span, the equivalent representation is such that taps to calculate an output bit are within a smaller shift register span.

9. The method of claim 7 wherein the equivalent representation includes two pairs of linear feedback shift registers wherein the second seed values for the second pair of linear feedback shift registers is different from a first seed value for the first pair of linear feedback shift registers.

10. The method of claim 7 wherein the pseudo-random code generator comprises a gold code generator.

11. The method of claim 7 wherein the pseudo-random code generator is implemented on a reconfigurable chip.

12. A method of implementing a pseudo-random code generator comprising:

converting a pseudo-random code generator specification into an equivalent representation, the psuedo-random code generator specification being such that taps to calculate an output are defined within a first shift register span, the equivalent representation is such that the taps to calculate an output bit are within a smaller shift register span; and implementing the equivalent representation such that multiple output bits are calculated at the same time.

13. The method of claim 12 wherein the pseudo-random code generation specification is such that taps used to calculate an output have at least one tap within n spaces from the input, the equivalent representation is such that no such tap is within n spaces from the input.

14. The method of claim 12 wherein two pairs of linear feedback shift registers are used in the equivalent representation.

15. The method of claim 14 wherein the second seed values for the second pair of linear feedback shift registers are different from the first seed values for the first pair of linear feedback shift registers.

16. The method of claim 12 implemented on a reconfigurable chip.

17. The method of claim 12 wherein in the equivalent representation of the output bits are calculated from taps at a single register for each linear feedback shift register.

18. A system comprising:

a gold code generator, wherein the gold code generator comprises multiple pairs of linear feedback shift registers implemented to simultaneously produce more than one state bit and more than one output bit for each linear feedback shift registers;

a reconfigurable chip where reconfigurable elements are selectively configured by at least the output of the gold code generator; and a communication element, coupled with the reconfigurable chip, to receive output from the reconfigurable chip to enable wireless communication.

19. The system of claim 18 wherein a configuration of the gold code generator is loaded into a background plane of the reconfigurable chip while the reconfigurable chip is operating on another configuration in a foreground plane, wherein once the gold code generator configuration is loaded into the background plane, the gold code generator configuration can be activated to produce an output, at least a subset of which is used to reconfigure the reconfigurable chip.

20. The system of claim 19 wherein the configuration in the foreground plane is an other gold code generator configuration.

21. The system of claim 18 wherein a seed value for a first pair of linear feedback shift registers are different from a seed value for other pairs of linear feedback shift registers.

22. The system of claim 21 wherein a subsequent seed value is calculated from the first seed value.

23. The system of claim 22 wherein the calculation of the subsequent seed value is done at least partially in a processor on the reconfigurable chip.

24. The system of claim 18 wherein the gold code generator is implemented on the reconfigurable chip.

25. The system of claim 18 wherein the communication element is a transmitter for spread spectrum transmission.

26. The system of claim 18 wherein the communication element is a receiver for spread spectrum reception.

* * * * *